(12) United States Patent
Chanclou et al.

(10) Patent No.: US 7,245,814 B1
(45) Date of Patent: Jul. 17, 2007

(54) LINE ATTENUATION DEVICE FOR MONOMODE FIBRES AND ASSOCIATED METHOD FOR THE PRODUCTION THEREOF

(75) Inventors: Philippe Chanclou, Troguery (FR); Monique Thual, Trebeurden (FR); Jean Lostec, Prat (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/890,810

(22) PCT Filed: Feb. 7, 2000

(86) PCT No.: PCT/FR00/00277

§ 371 (c)(1),
(2), (4) Date: Jan. 4, 2002

(87) PCT Pub. No.: WO00/48028

PCT Pub. Date: Aug. 17, 2000

(30) Foreign Application Priority Data

Feb. 8, 1999  (FR) .................................. 99 01455

(51) Int. Cl.
*G02B 6/26* (2006.01)
(52) U.S. Cl. .................. 385/140; 385/34; 385/28; 385/43
(58) Field of Classification Search ............... 385/140, 385/43, 34, 27–29, 33, 49
See application file for complete search history.

(56) References Cited

U.S. PATENT DOCUMENTS

| 5,095,519 | A | * | 3/1992 | Dorsey | 385/140 |
| 5,581,649 | A | | 12/1996 | Paquette et al. | 385/140 |
| 5,633,974 | A | | 5/1997 | Chia | 385/140 |
| 5,917,985 | A | * | 6/1999 | Im | 385/140 |
| 2002/0114606 | A1 | * | 8/2002 | De Bougrenet et al. | 385/140 |

FOREIGN PATENT DOCUMENTS

| DE | 37 40 378 A1 | 6/1992 |
| EP | 0 161 826 | 11/1985 |
| EP | 0 415 516 | 3/1991 |
| EP | 0 491 366 | 6/1992 |
| EP | 0 575 993 | 12/1993 |
| JP | 62119503 | 5/1987 |
| WO | WO 93/13437 | 7/1993 |

OTHER PUBLICATIONS

Briley; *An Introduction to Fiber Optics System Design*; Chapt. 2.5; p. 42; 1990.

* cited by examiner

*Primary Examiner*—Hemang Sanghavi
(74) *Attorney, Agent, or Firm*—Patterson, Thuente, Skaar & Christensen, P.A.

(57) ABSTRACT

A line attenuation device for monomode fibers having at least one attenuating element with at least one graded-index multimode fiber section placed between two monomode fibers and coupled to at least one coreless silica fiber section.

9 Claims, 3 Drawing Sheets

LINE ATTENUATION DEVICE FOR MONOMODE FIBRES AND ASSOCIATED METHOD FOR THE PRODUCTION THEREOF

BACKGROUND OF THE INVENTION

The invention relates to an on-line attenuation device for a monomode fibre. It also relates to a method of manufacturing such a device.

1. Field of the Invention

The field of the invention is that of optical telecommunications and more particularly that of distribution networks.

Distribution networks relate to short-distance links and require significant resources in terms of cost both with regard to the infrastructure and the components. It is in this context that the invention is situated.

It should be stated that there may be a need to use optical attenuators notably in order to obtain an equalisation of the powers of the signal of several communication channels. It is also possible to use such attenuators in order to produce optical interferometers. There may also be a need to use optical attenuators in the laboratory in order to simulate optical transmission lines.

2. Discussion of the Related Art

The fixed on-line attenuators on optical fibres which are used most often are those which use the following techniques:

- transverse offset of two fibres during their welding. This technique is described in the document WO 931 437;
- the use of the curvature of the fibre in order to attenuate the signal. Such a technique is described in the document U.S. Pat. No. 5,581,649;
- thinning of the fibre;
- the use of a section of attenuating doped fibre between two monomode fibres. This technique is described in the document U.S. Pat. No. 5,633,974;
- a section of pure undoped silica without a guide, welded between two monomode fibres. This technique is described in the document U.S. Pat. No. 5,095,519;
- a section of fibre with an index gradient held by a ferrule between two optical fibres. This technique is described in the document JP 62 119503 A.

The technology of attenuators which uses the principle of offset or thinning is not compatible with mass production methods.

The attenuators functioning on the principle of the use of a radius of curvature or a doped section require fairly complex implementation. And the technique of attenuators with a section of undoped fibre does not make it possible to have very broad manufacturing tolerances.

In addition, apart from the complexity introduced with regard to the connection of the fibres by the ferrule, the attenuator with a section of fibre with an index gradient is not suited to a collective production and does not make it possible to have very broad manufacturing tolerances.

OBJECTS AND SUMMARY OF THE INVENTION

In addition, the introduction of optics as a transmission means in distribution networks makes it necessary to reduce the cost of the components. It is therefore in this context that the inventors have conceived an attenuation function on optical fibre, simple to implement in a reproducible, economical and collective manner (from ribbons of fibres).

The on-line attenuator in accordance with the invention has the advantage of not modifying the external appearance or the geometrical and mechanical parameters of the optical fibre. The value of the attenuation is given with a margin $\geq$ than that of the commercially available components (plus or minus 0.3 dB).

Thus a first object of the invention relates to an on-line attenuation device for monomode fibres, principally characterised in that it has, placed between two monomode fibres, at least one attenuating element comprising at least one section of multimode fibre with an index gradient and at least one section of silica fibre without a core.

According to another characteristic of the invention, the attenuating element includes at least one other section of silica fibre without a core, the section of fibre with an index gradient being placed between the sections of silica fibres without a core.

According to another characteristic, the attenuating element has the same external geometrical parameters as the monomode fibres to which it is connected. The connection advantageously consists of a weld.

According to another characteristic, the device comprises a plurality of attenuating elements disposed in order to form a ribbon or block so as to be placed between ribbons of monomode fibres.

A second object of the invention relates to a method of manufacturing an on-line attenuation device for monomode fibres, principally characterised in that it consists in successively effecting steps of assembling and breaking ribbons of monomode fibres so as to obtain two ribbons of monomode fibres assembled through an attenuation device which is obtained by breaking at least one ribbon of fibres with an index gradient and connecting to at least one broken ribbon of silica fibres without a core.

According to another characteristic the method includes a step of breaking at least one ribbon of silica fibres without a core and connecting with the broken fibre ribbon with an index gradient thus placed between two ribbons of silica fibre without a core.

According to another characteristic, the method of manufacturing an on-line attenuation device for monomode fibres includes the following steps:

- collectively connecting a ribbon of n monomode fibres with an index gradient to a ribbon of n silica fibres without a core;
- breaking the ribbon of n silica fibres without a core so as to obtain n sections of predetermined length (Ls),
- collectively connecting a ribbon of n monomode fibres to the n sections of silica without a core,
- breaking the ribbon of n multimode fibres with an index gradient so as to obtain n sections of predetermined length (Lg),
- collectively connecting a ribbon of n monomode fibres to the n sections with an index gradient.

The latter step is possibly replaced by the following steps:

- collectively connecting a ribbon of n silica fibres without a core to the n sections with an index gradient,
- breaking the ribbon of n silica fibres without a core so as to obtain n sections of predetermined length (L's),
- collectively connecting a ribbon of n monomode fibres to the n sections of silica without a core.

BRIEF DESCRIPTION OF THE DRAWINGS

Other advantages and particularities of the invention will emerge clearly from a reading of the description which is made below and which is given by way of illustrative and non-limitative example with regard to the drawings, in which.

DESCRIPTION OF THE PREFERRED EMBODIMENTS

The attenuator according to the invention is based on the principle of the mismatching of the light beam coming from one monomode fibre to another monomode fibre.

Figure 1A:
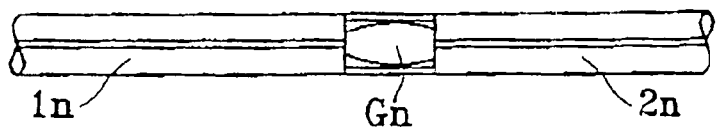
FIG. 1a) depicts a particular embodiment of the invention.
Figure 1B:
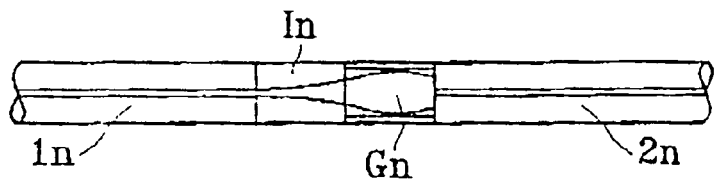
FIGS. 1b) and 2 depict an attenuator according to respectively a first and a second preferential embodiment of the invention.

For the remainder reference can be made to the diagram in FIG. 1b), which illustrates an attenuator according to a first preferential embodiment of the invention.

According to this embodiment, a monomode fibre in is connected to a monomode fibre 2n through a section of silica without a core In coupled to a section of fibre with an index gradient Gn.

The principle of the attenuator functions on the mismatching of the light beams rather than on the absorption of an intermediate material, such as is the case with fibres attenuating by doping.

The advantage of the use of an undoped section between the monomode fibres (as in the state of the art) and consequently the advantage of the structure proposed by the present invention is that the size and the radius of curvature of the light beam are controlled as required by the choice of the section of fibre with an index gradient.

Figure 2:
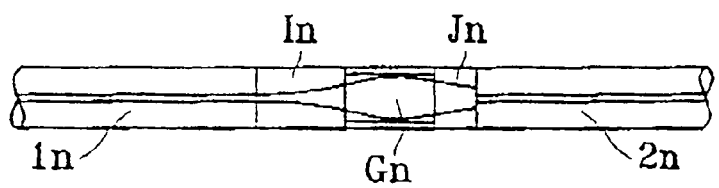

FIG. 2 illustrates a second preferential embodiment according to the invention.

According to this mode, there is a monomode fibre 1n coupled to a monomode fibre 2n through this time on the one hand the section of silica fibre In, the section of fibre with an index gradient Gn and another section of silica fibre Jn.

Adding an additional section of silica Jn between the monomode fibre and the index gradient increases the attenuation range which can be achieved.

It will be understood easily that these embodiments are not the only ones and that it is possible to add as many silica sections and index gradients as is necessary between the monomode fibres according to the attenuation which it is wished to achieve.

The modification of the size and radius of curvature of the Gaussian beam gives rise to coupling losses corresponding to the poor overlap of the two fields. This modification depends on the length of the different sections of silica and index gradient.

In a multimode fibre with index gradient, the light beams undergo a change to their propagation constant along the optical axis. The silica, for its part, is a neutral medium, without interaction, on the propagation. The use of these two media makes it possible to modify the light propagation in order to go from one monomode fibre to another. It is then possible to determine the lengths of these different sections in order to cause a poor overlap of the beam on the monomode fibre according to the attenuation which is required. This is because losses and therefore attenuations are associated with these different overlaps of the beams.

It may be remarked that, even if the component is not symmetrical from the point of view of the lengths and nature of the sections, the attenuation is equivalent in one direction or other of the propagation in it. It will also be remarked that the sections of fibres depicted in FIGS. 1b) and 2 have the same external geometrical parameters as the monomode fibres to which they are connected. This characteristic facilitates the use of the attenuator and its manufacturing method, in particular when it is a case of ribbons.

Figure 3:
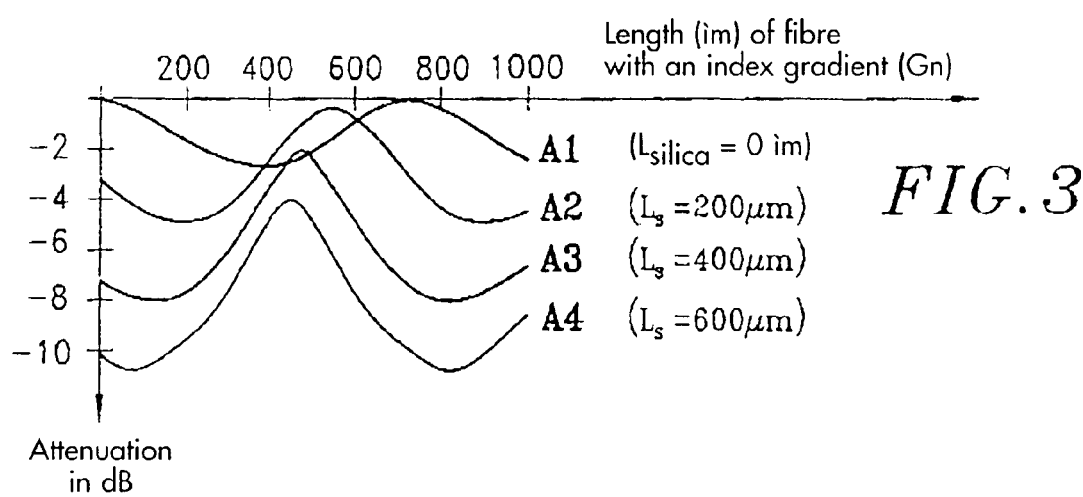
FIG. 3 depicts the attenuations in dB as a function of different lengths of the section of fibre with an index gradient in the case of the embodiments depicted in FIGS. 1a and 1b.

An illustration will now be given of the results which can be obtained from an attenuator according to the invention using curves which can be seen in FIGS. 3 and 4. First of all, FIG. 3 depicts different attenuation curves A1 to A4 corresponding respectively to the variations in attenuation for lengths Lg of sections of fibre with an index gradient varying from 0 to 1,000 micrometers, each of the curves being obtained for a fixed length of silica section Ls. The curve A1 is obtained for a section of silica whose length Ls=0 micron, that is to say in the absence of a silica section; the attenuator corresponding to this curve A1 is depicted in FIG. 1a). The curve A2 is obtained for a section of silica of length Ls=200 microns, the curve A3, Ls=400 microns and the curve A4, Ls=600 microns.

Figure 4:
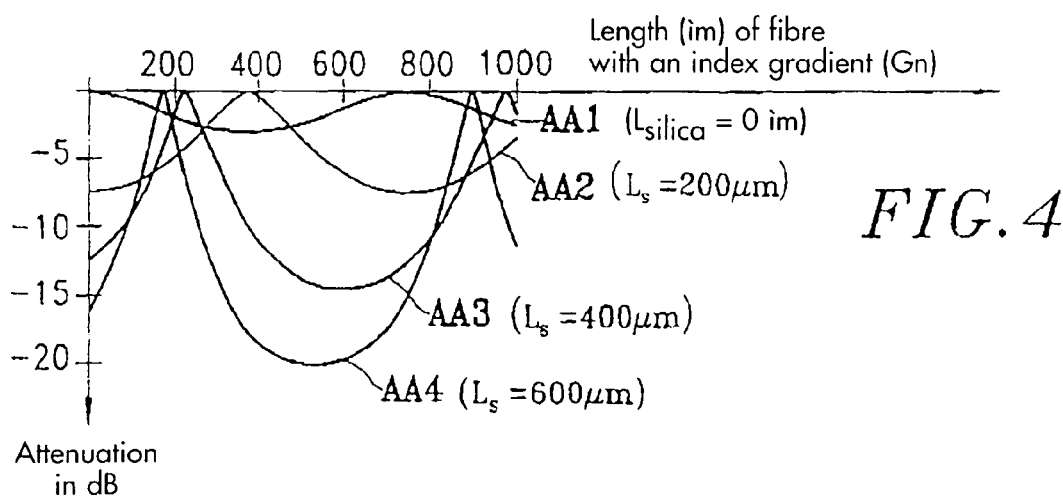
FIG. 4 depicts the attenuations in dB as a function of the different lengths of the section of fibre with an index gradient in the case of the embodiments depicted in FIGS. 1a) and 2.

FIG. 4 illustrates the case of the different attenuation curves for a double attenuator, that is to say one having two sections of silica, one section on each side of the section of fibre with an index gradient.

Different attenuation curves are also obtained, respectively referenced AA1, AA2, AA3, AA4. The curve AA1 is obtained when the sections of silica Ls are fixed at a zero length, that is to say there is no section of silica; the attenuator corresponding to this curve AA1 is depicted in FIG. 1a). The curve AA2 is obtained for variations in the length of the section with an index gradient between 0 and 1,000 micrometers and sections of silica having a length Ls=200 micrometers. The curve AA3, the section of silica has a length Ls=400 micrometers and the curve AA4, the sections of silica have a length Ls=600 micrometers.

The method of manufacturing such attenuators according to the present invention will now be described.

Figure 5A:
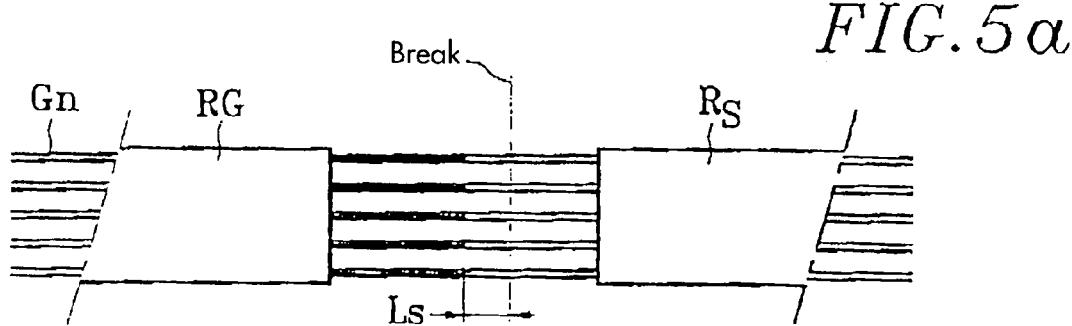
FIGS. 5a to 5e depict the different steps of a manufacturing method according to the invention.

The technology of these attenuators is particularly well adapted to manufacture directly from ribbons of fibres RG, RS as illustrated in FIG. 5a.

The simple and reproducible character of these attenuators contributes to a consequent reduction in the cost of the components thus obtained.

The attenuators as depicted in FIGS. 1a, 1b and 2 can be produced collectively with the method according to the invention which will be described hereinafter.

This method consists in successively effecting steps of connecting and breaking ribbons of fibres so as to obtain two monomode fibre ribbons connected through the attenuation device which is obtained by at least one broken ribbon of fibres with an index gradient.

Hereinafter, the method will be detailed in the case of a production of attenuation devices based on the embodiment depicted in FIG. 1b).

Figure 5B:
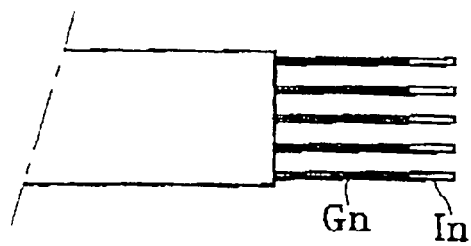
Figure 5C:
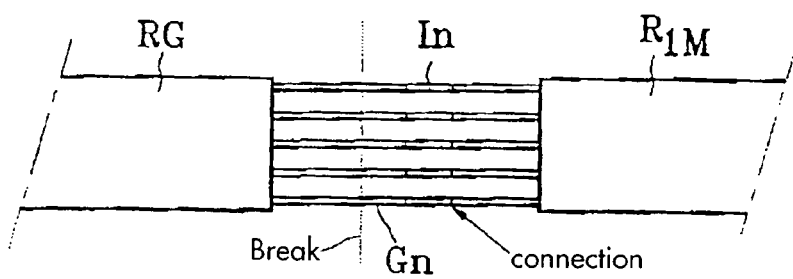
Figure 5D:
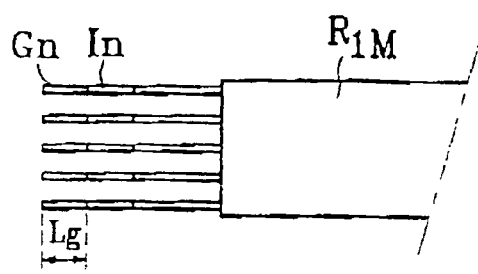
Figure 5E:
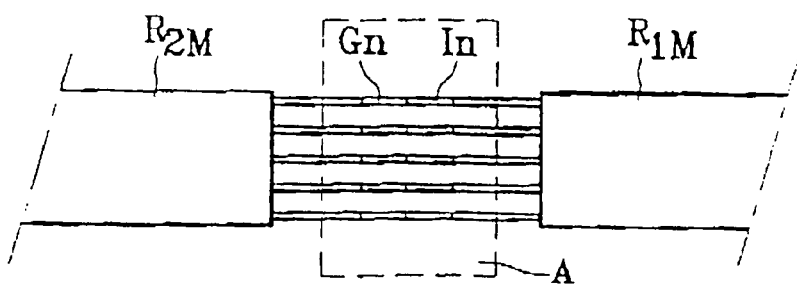

Preferentially, in the method according to the invention:

1.—a ribbon RG of n multimode fibres with an index gradient Gn is connected by welding collectively to a ribbon RS of n silica fibres without a core In (FIG. 5a);

2.—the ribbon RS of n silica fibres without a core is broken so as to obtain n sections of fibres In of length Ls (FIG. 5b);

3.—a ribbon of n monomode fibres R1M is welded to the n sections of silica without a core In (FIG. 5c);

4.—the ribbon RG of n multimode fibres Gn with an index gradient is broken so as to obtain n sections of length Lg (FIG. 5d);

5.—a ribbon R2M of n monomode fibres is welded collectively to the n sections with an index gradient (FIG. 5e).

In the case of an attenuator as depicted in FIG. 2a, the method is identical, adding a stage making it possible to have a section of silica Jn between the section with an index gradient Gn and the monomode fibres 2n.

Any attenuation device containing x sections of silica and y sections with an index gradient between two ribbons of monomode fibres can be obtained collectively according to the method which has just been described.

Figure 6A:
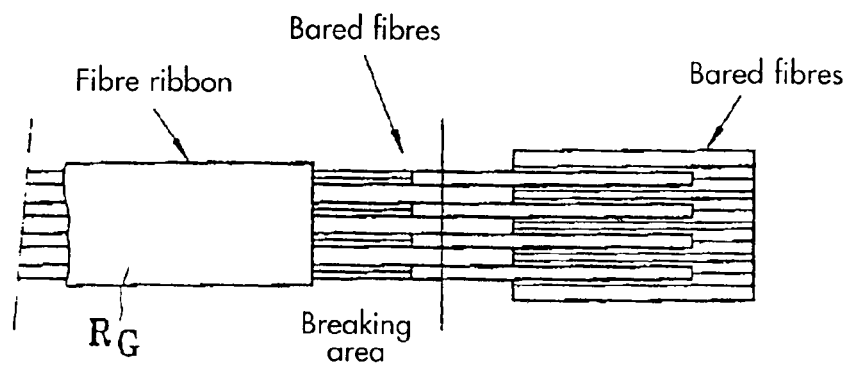
FIG. 6a depicts schematically the splitting operation.
Figure 6B:
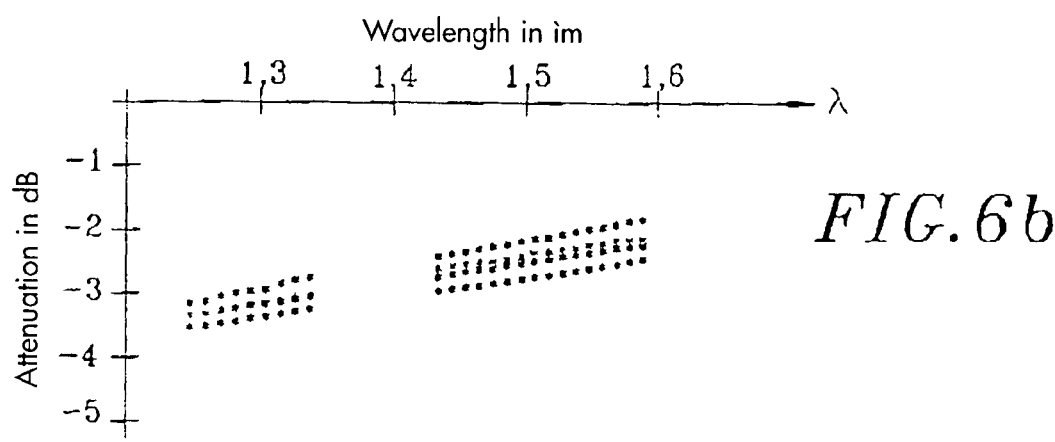
FIG. 6b depicts the different attenuation levels as a function of the wavelength in the case of a ribbon with four fibres.

FIG. 6b illustrates experimental results. This figure has experimental attenuation values for a ribbon with four fibres in the windows with a wavelength λ varying between 1.3 and 1.6 micrometers for a length of fibre section with an index gradient Lg=400 micrometers. These experimental results show that the influence of the wavelength on the attenuation is entirely comparable with the existing attenuation techniques.

Figure 7:
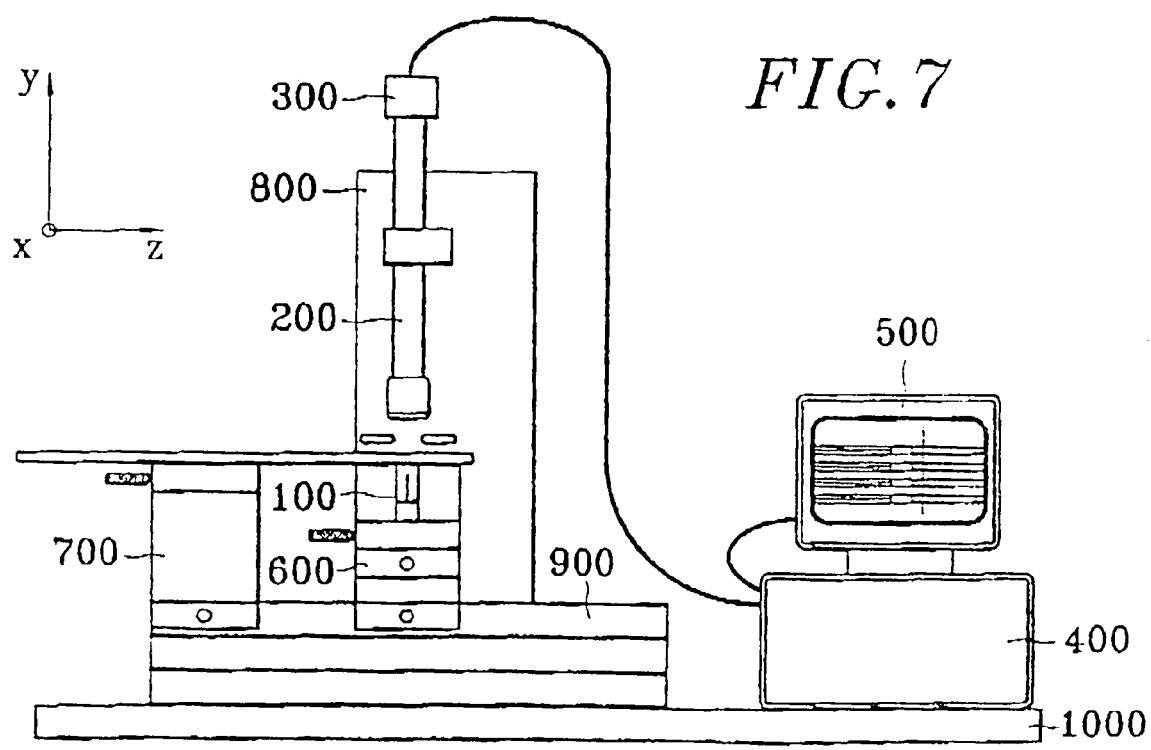
FIG. 7 depicts a fibre breaking bench for breaking ribbons according to the method of the invention.

The collective manufacturing method which has been described can be implemented using a fibre ribbon breaking bench as depicted in FIG. 7.

However, this bench includes a fibre guidance piece for improving the precision of the splitting, depicted in FIG. 6a. This is because, in order better to preserve the alignment of the bared fibres at the pitch of 250 µm, it is necessary to guide the end of the fibres in order to limit their opening up. Positioning Vees at a pitch of 250 µm are disposed on the splitter in order to keep the fibres parallel. This guidance piece affords better efficacy to the precision splitting and better evenness of the lengths.

The fibre ribbons can be welded by means of a standard ribbon welder.

The different steps described above are observed by means of a video microscope 200 with annular illumination placed above the rail 900 supporting the breaking clamp 100.

This is a clamp for breaking the ribbons, for example like the clamp sold by the company Fujikura. Any collective breaking clamp may be suitable in so far as it allows observation of the breaking area from above.

The video microscope 200 is connected to a camera 300 whose image is displayed on a video monitor 500 after processing by a distance measuring system 400. This system projects straight lines which can be moved on the screen and makes it possible, with prior calibration, to measure the distances.

The breaking clamp 100 can move in the three directions x, y and z by means of the unit 600 comprising a manual micrometric movement plate, itself fixed to the rail 900 by means of a slide. The fibre ribbon is moved along the optical axis z by means of the unit 700, which comprises a manual micrometric movement plate connected to the same rail 900 by a slide. This degree of freedom along the optical axis z makes it possible to bring the welding plane to the required position with respect to the blade of the breaking clamp.

The alignment between the welding plane and the outline of the blade is effected visually by means of the video microscope. The movement of the ribbon is adjusted to the required dimension by means of the measuring system 400. The video microscope is held by a bracket 800, the whole being supported by a stable base 1000.

The invention claimed is:

1. An on-line attenuation device for monomode fibres, characterised in that it has, placed between and physically connected to, two monomode fibres ($1n$, $2n$), at least one attenuating element comprising at least one section of multimode fibre with an index gradient (Gn) connected to at least one section of silica fibre without a core (In).

2. An on-line attenuation device for monomode fibres, characterised in that it has, placed between two monomode fibres ($1n$, $2n$), at least one attenuating element comprising at least one section of multimode fibre with an index gradient (Gn), at least one section of silica fibre without a core (In), and at least one other section of silica fibre without a core (Jn), the section of fibre with an index gradient (Gn) being placed between the sections of silica fibre without a core (In, Jn).

3. An on-line attenuation device according to claim 1, characterised in that, at both connections between the attenuating element and one of the monomode fibres, the attenuating element has an external geometrical shape that is the same as an external geometrical shape of the one of the monomode fibres to which it is connected.

4. An on-line attenuation device according to claim 3, characterised in that both connections are formed by welding.

5. An on-line attenuation device according to claim 1, characterised in that it comprises a plurality of attenuating elements (A) disposed so as to form a ribbon or a block so as to be placed between ribbons of monomode fibres ($R_{1M}$, $R_{2M}$).

6. A method of manufacturing an on-line attenuation device for monomode fibres, comprising the steps of connecting the end of a fibre ribbon with the end of another fibre ribbon and breaking the connected fibre ribbons at a location other than the connection point between them, and repeating the steps of connecting and breaking, so as to obtain a continuous fibre ribbon including two sections of monomode fibres ($R_{1M}$, $R_{2M}$) connected through the attenuation device which is obtained by breaking at least one ribbon of fibres with an index gradient (RG) and connecting to at least one broken ribbon of silica fibres without a core ($R_S$).

7. A method of manufacturing an on-line attenuation device for monomode fibres, according to claim 6, characterised in that it includes the following steps:

collectively connecting a ribbon of n monomode fibres with an index gradient (RG) to a ribbon of n silica fibres without a core ($R_S$);

breaking the ribbon of n silica fibres without a core ($R_S$) so as to obtain n sections (In) of predetermined length (Ls), collectively connecting a ribbon of n monomode fibres ($R_{1M}$) to the n sections of silica without a core (In), breaking the ribbon of n multimode fibres with an index gradient (RG) so as to obtain n sections (Gn) of predetermined length (Lg), and collectively connecting a ribbon of n monomode fibres ($R_{2M}$) to the n sections with an index gradient (Gn).

8. A method of manufacturing an on-line attenuation device for monomode fibres, according to claim 6, characterised in that it includes the following steps:

collectively connecting a ribbon of n monomode fibres with an index gradient (RG) to a ribbon of n silica fibres without a core ($R_S$);

breaking the ribbon of n silica fibres without a core ($R_S$) so as to obtain n sections (In) of predetermined length (Ls), collectively connecting a ribbon of n monomode fibres ($R_{1M}$) to the n sections of silica without a core (In), breaking the ribbon of n multimode fibres with an index gradient (RG) so as to obtain n sections (Gn) of predetermined length (Lg), collectively connecting a ribbon of n silica fibres without a core ($R_S$) to the n sections with an index gradient (Gn), breaking the ribbon of n silica fibres without a core ($R_S$) so as to obtain n sections (Jn) of predetermined length (L's), and collectively connecting a ribbon of n monomode fibres ($R_{2M}$) to the n sections of silica without a core (Jn).

9. A method of manufacturing an on-line attenuation device for monomode fibres comprising the steps of connecting and breaking fibre ribbons so as to obtain two ribbons of monomode fibres ($R_{1M}$, $R_{2M}$) connected through the attenuation device which is obtained by breaking at least one ribbon of fibres with an index gradient (RG) and connecting to at least one broken ribbon of silica fibres without a core ($R_S$) and further includes the breaking of another ribbon of silica fibres without a core ($R_S$) and the connection to the broken ribbon of fibres with an index gradient (RG) that is thus placed between two ribbons of silica fibre without a core.

* * * * *